April 24, 1951     C. R. PATON     2,549,925
MOTOR VEHICLE
Filed May 12, 1947     2 Sheets-Sheet 1
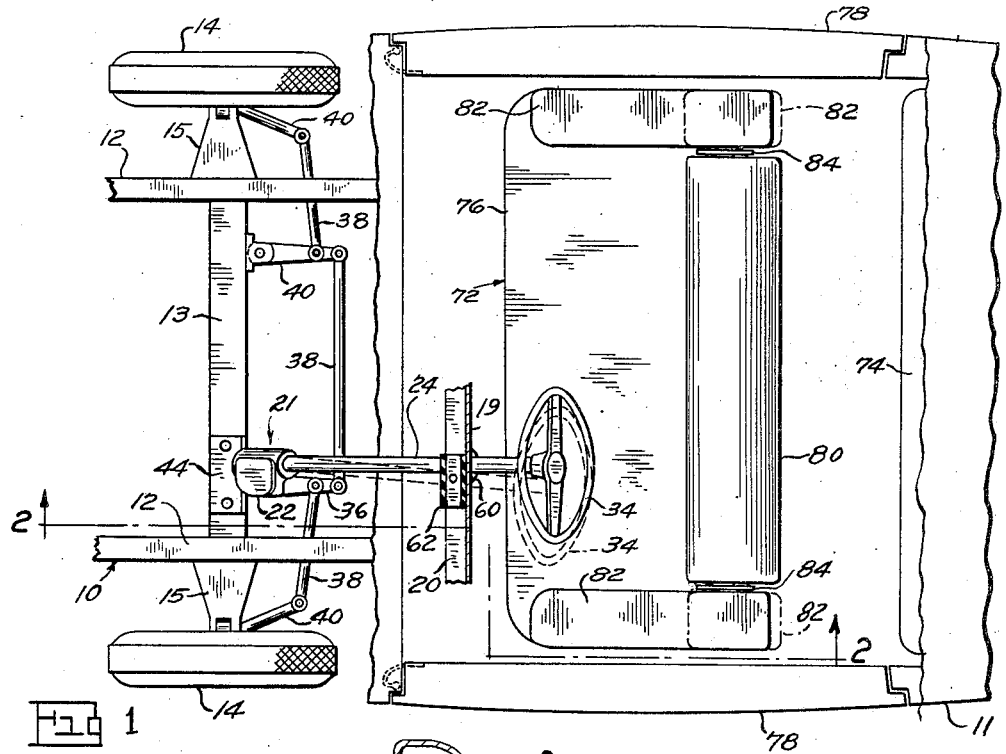
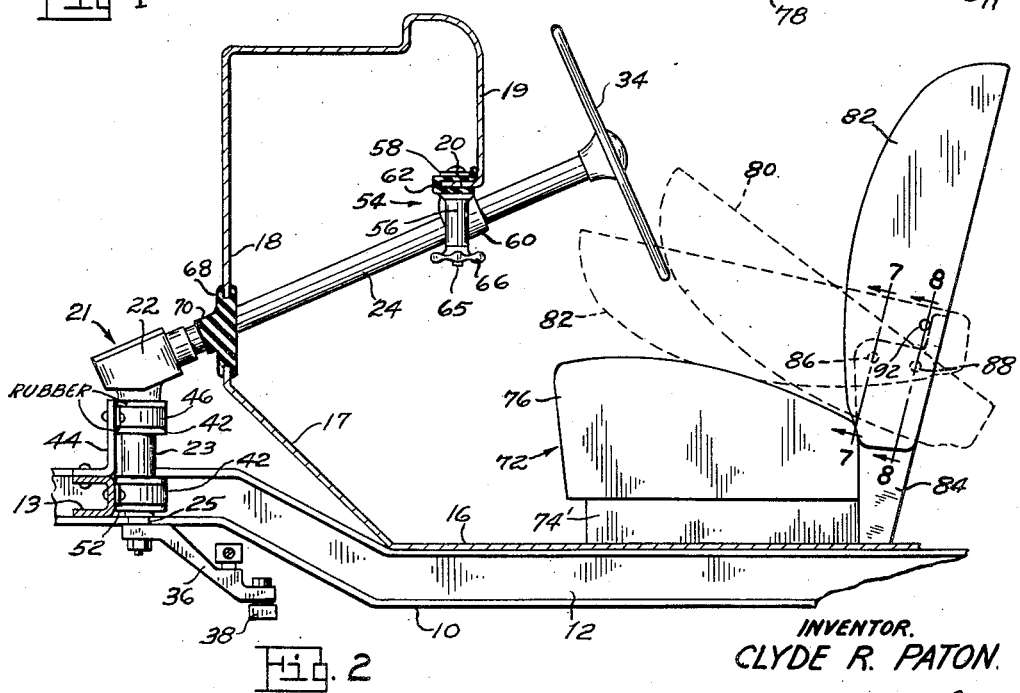
INVENTOR.
CLYDE R. PATON.
BY Wallace P. Lamb
ATTORNEY April 24, 1951 C. R. PATON 2,549,925
MOTOR VEHICLE
Filed May 12, 1947 2 Sheets-Sheet 2
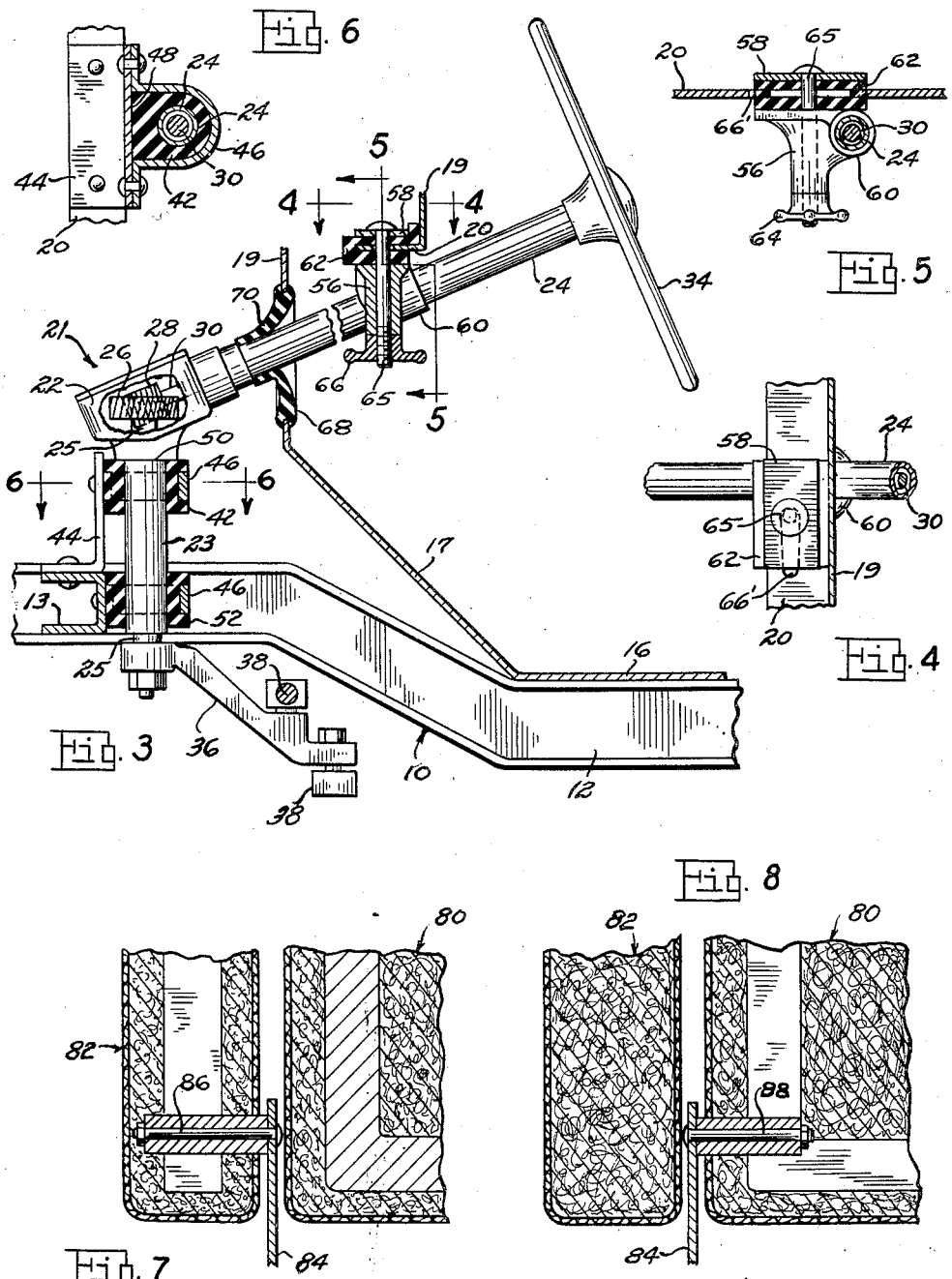
INVENTOR.
CLYDE R. PATON.
BY Wallace P. Lamt
ATTORNEY.

Patented Apr. 24, 1951

2,549,925

UNITED STATES PATENT OFFICE 2,549,925

MOTOR VEHICLE

Clyde R. Paton, Bloomfield Village, Mich.

Application May 12, 1947, Serial No. 747,479

6 Claims. (Cl. 74—493)

This invention relates generally to motor vehicles and particularly to the mounting of steering gears therefor.

It is an object of the present invention to provide an improved motor vehicle in which road shocks and engine vibrations normally transmitted to steering gear apparatus are dampened or diminished so that they are not felt in the steering wheel by the driver of the vehicle.

Another object of the invention is to provide an efficient yet inexpensive vibration insulating mounting for a steering gear.

Another object of the invention is to provide in a motor vehicle an improved arrangement of a steering gear, and vibration insulating mountings therefor.

Another object of the invention is to provide an improved motor vehicle having a steering wheel the position of which may be readily adjusted laterally, at the will of the driver to suit his seating position.

Other objects of the invention will become apparent from the following detailed description taken in connection with the accompanying drawings in which:

Fig. 1 is a fragmentary plan view of the front end of a motor vehicle embodying features of the present invention.

Fig. 2 is a sectional view of the vehicle, taken along the line 2—2 of Figure 1.

Fig. 3 is an enlarged, fragmentary side view of the vehicle including the steering apparatus.

Fig. 4 is a fragmentary detailed view taken along the line 4—4 of Figure 3.

Fig. 5 is a cross sectional view of steering apparatus, taken along the line 5—5 of Figure 3.

Fig. 6 is a sectional view taken along the line 6—6 and

Figs. 7 and 8 are enlarged, fragmentary sectional views of the front seat, taken respectively along the line 7—7 and 8—8 of Figure 2.

Referring to the drawings by characters of reference, the motor vehicle shown includes a body supporting means or chassis frame 10 and a body 11. The chassis frame 10 may be of any suitable construction, the present frame comprising a pair of spaced, side frame members 12 and cross members 13. Only one of the frame cross members 13 is shown, this cross member being located adjacent to and forwardly of the body 11. At opposite ends of the frame cross member 13 are the usual stearable ground wheels 14 which may be connected to the frame 10 by individual wheel suspension devices, including arms 15. These wheel suspension devices are not herein shown or described in detail since such devices are well known in the art and since they form no part of the present invention.

The body 11 includes the usual floor pan 16 seating on the frame 10 to which the body may be secured by welding the floor pan thereto. Extending upwardly and forwardly of the floor pan 16 is the usual dash panel 17, 18 which is located just rearwardly of the frame cross member 13. Spaced rearwardly of the dash panel 17, 18 is the usual instrument panel 19 having a forwardly directed, reinforcing flange 20 extending along its lower edge.

Supported by the frame cross member 13 is a steering gear apparatus, having a supporting member or casing 21. The steering gear casing 21 comprises, in general, a gear box 22, a cross shaft housing 23 and a column 24. The gear box 22 is disposed above the frame cross member 13, adjacent to and forwardly of the body dash panel 17, 18. One end of the column 24 is secured to the gear box 22, the column extending therefrom upwardly and rearwardly through a large clearance hole in the dash 17, 18 to extend beneath and adjacent the lower edge of the instrument panel 19. Integral with and joining the underside of the gear casing 21 is the housing 23 for housing a gear cross shaft 25, the housing 23 preferably being tubular and preferably being disposed with its longitudinal axis vertical for mounting the steering gear against frame vibrations, as will later be seen. Secured to the cross shaft 25, a gear 26 meshes with a worm gear 28 in the casing gear box 22, the worm gear 28 being secured to the lower end of a worm shaft 30 extending upwardly through the inclined column 24. On the upper end of the worm shaft 30 is secured the usual steering wheel 34. Secured to the lower end of the gear cross shaft 25 is an operating lever 36 connected by links 38 and levers 40 to the ground wheels 14.

In order to decrease transmission of road shock and engine vibrations to the steering apparatus, I provide a vibration insulator or dampener 42, interposed between and connecting the steering apparatus and frame cross member 13 together. This vibration insulator 42 is a resilient, restraining member preferably made of rubber in the general form of a bushing to fit tightly around or receive the tubular cross shaft housing 23. The inner diameter of this rubber bushing 42 may be made initially sufficiently smaller than the diameter of the tubular cross shaft housing 23 and forced thereon to obtain adherence of the parts due to the contractual force of the rubber. A bracket 44 rigidly secured to the frame cross member 13 supports the rubber bushing 42 which is secured thereto by a clamp or U-retainer strap 46. An annular retainer slot or groove is provided in the outer periphery of the bushing 42 to receive the clamp 46. The clamp 46 may be riveted adjacent its opposite ends to the bracket or may be secured thereto by any other suitable means. As shown in Figure 6, the rubber bushing 42 preferably has a flat side 48 engaging and held tightly against one side of the bracket 44 by the clamp 46 to hold the bushing against rotation. Adjacent the underside of the gear box 22, the cross shaft tubular housing 23 is provided with an external, downwardly facing annular shoulder 50 which seats on the upper surface of the rubber bushing 42 in a manner such that there is no metal to metal contact between the steering gear and the frame bracket.

Spaced below the rubber bushing 42, I provide a second vibration insulator or rubber bushing 52 receiving the tubular cross shaft housing, adjacent the lower end thereof the bushing 52 being held by a clamp 48, secured to cross member 13. The rubber bushing 52 cooperates with the upper rubber bushing 42 to restrain yieldably, transverse rocking motion of the housing 22 and generally to dampen vibrations of the steering gear. Like the upper bushing 42, the lower bushing 52 is preferably made with an initially smaller internal diameter than the external diameter of the cross shaft housing 23 so that the bushing rubber will adhere to the housing 23 in a bonded-like relationship. If desired, instead of being pressed onto the cross shaft housing, the rubber bushings may be bonded to the cross shaft housing or to the clamps 46, 48 or to both. By the above described construction, it will be seen that the rubber bushings 42, 52 are in shear upon vertical vibration of the vehicle frame, restraining the steering gear and diminishing the vibrations transmitted to the steering gear from both the frame and from the steerable road wheel connections. These bushing mountings 42, 52 give a high order of cushioned restraint in the transverse plane of action of the steering linkage and give a relatively low order of restraint vertically. By having a substantial spread of rubber bushings 42, 52 and by having these bushings placed either vertically or near vertically, a substantial degree of shock cushioning is obtained for minimizing transmission of frame vibration to the steering gear and a high degree of restraint is obtained against elasticity in the steering result.

The provision of the rubber bushings 42, 52 arranged in the manner described not only cushions vibration, but provides for a limited adjustment movement of the steering gear column 34 about the vertical axis of the tubular cross shaft housing 23, at the will of the driver. A manually operable lock or clamp, designated generally by the numeral 54, is provided to lock the steering column 34, in adjusted position, to the instrument panel 18. The lock 54 comprises a clamp body 56 and a clamp plate 58 cooperable to hold the column 34 to the instrument panel flange 20. A collar 60, integral with the clamp body 56 is secured onto the steering column 34. Interposed between the clamp body 56 and the clamp plate 58, I provide a resilient, vibration dampener or insulator 62, preferably a rubber pad. In the present instance, the rubber pad 62 is slit horizontally to receive the instrument panel flange 20. An upper flat surface of the clamp body 56 engages the underside of the rubber pad 62 and the clamp plate 58 is drawn down against the upper surface of the rubber pad 62 by a nut 66 threaded onto the lower end of a bolt 65 which extends vertically through the clamp body 56 and clamp plate 58 and through a transversely elongated slot 66' in the instrument panel flange 20. The slot 66' allows for lateral adjustment of the position of the steering column 24 and the width of the slot 66' is made sufficiently greater than the diameter of the clamp bolt 65 to allow for the arcuate movement of the bolt about the vertical axis of the cross shaft housing when adjustment is made.

Held to the dash panel 18 around the steering column 24 there is a grommet-like seal 68 in the dash panel clearance hole to seal the passenger compartment from the engine compartment forwardly thereof. The seal 68 is preferably made of rubber, but may be made of any suitably flexible and resilient material. This grommet-like seal has a forwardly extending neck portion 70 which is laterally flexible to allow lateral adjustment positioning of the steering column 24 without breaking the seal at the dash. The neck portion 70 of the seal tightly grips the column 24 due to the contractual force of the rubber which is stretched when the column 24 is pressed through the seal.

The body 11 is of the two-door type having a front seat 72 and a rear seat 74, supported by the body floor pan 16 and other underbody structural members. The front seat 72 comprises, in general, a seat base 74' and a seat cushion 76. As shown in Figure 1, the seat 72 extends substantially entirely across the vehicle body, the seat cushion being sufficiently wide to accommodate three passengers including the driver, if the driver sits closer than normally to his side of the vehicle body. At opposite sides of the seat 72 are the usual body doors 78 common to both front and rear seat compartments. As is well known in two-door vehicle bodies, the passageways behind the front seat for the rear compartment have been, from the standpoint of convenience, inadequate and have been made so because of the desirableness of inclined front seat backs and because of the undesirableness of extremely wide doors. Tiltable front seat backs have, of course, improved the above mentioned condition, but these seat backs are divided into two equal parts which when tilted forward inconvenience the front seat occupants.

In order to provide adequate passage space behind the front seat for the rear seat compartment without unduly inconveniencing front seat occupants, I provide a full width seat back comprising, a relatively wide intermediate section 80 and relatively narrow, opposite and tiltable side sections 82. These seat back, side sections 82 not only may be tilted forwardly and downwardly to allow ease of passage behind the front seat into the rear seat compartment, but are constructed and arranged to serve also as front seat arm rests when swung down onto the front seat cushion. The intermediate seat back section 80 is also pivoted or hinged so that it may be tilted forward, if desired, as may be necessary for clearance, for example, of large packages. A pair of upright brackets 84 is provided on which the seat back sections 80, 82 are pivotally supported, the brackets 84 being rigidly secured to the seat base 74'. The pair of brackets 84 may be respectively located between the opposite ends of the seat back center section 80 and the adjacent, seat back side sections 82. Similar, laterally extending pivot pins or hinge bolts 86, 88 carried by the brackets 84 respectively pivotally support the center and end seat back sections 80, 82. These pivot pins 86, 88 are received in metal sleeves 90 carried by and secured to the seat back sections framework. As shown in Figure 2, the seat back pivot pins 86, 88 are relatively offset, pins 86 of the end sections 82 preferably being located forwardly of and slightly above the pivot pins 88 of the outer seat back section 80. Any suitable stops may be employed to limit backward movement of the hinged seat back units such as indicated at 92, Fig. 2 but not otherwise shown.

When one or two persons occupy the front seat of the vehicle, the seat back side sections 82 may be used as arm rests. As arm rests, the side seat back sections decrease the usable width of the seat which decreased width may be sufficient to accommodate two persons comfortably. When the driver uses his arm rest, the position of the steering gear casing and therefore the position of the steering wheel is in what may be termed, normal positions convenient to the driver. In this position of the steering wheel, the clamp bolt 65 is adjacent one end of the clamp plate slot 66 as a stop which limits adjustment movement of the steering gear to the right. When three persons occupy the front seat, the arm rest-seat back sections function as seat back end sections providing a seat back extending entirely across the body the full width of the seat. With three persons occupying the front seat, the driver will be seated closer to his side of the body, but instead of steering from an awkward, uncomfortable position, the driver may, at will, release the steering column clamp and swivel the steering gear to the left or toward his side of the vehicle and lock the steering gear in the desired adjusted position.

In operation of the vehicle over uneven road surfaces, the vehicle frame will vibrate or oscillate or both. However, by the provision of the herein described rubber mountings or bushings 42, 52 supporting the steeering gear as stated above, the frame vibrations will be dampened with corresponding reduction of harshness felt in the steering wheel 34 by the driver. Dampening of these vibrations is also aided by the intermediate seal-insulator 68 and by the upper or adjustment clamp insulator 62.

From the foregoing description it will be noted that I have provided an improved motor vehicle with respect to mounting a steering gear so as to dampen vibrations thereof. Also, it will be noted that I have provided a steering gear which may be laterally adjusted to suit the driver.

Although a preferred form of the invention has been illustrated and described in detail, it will be apparent to those skilled in the art that various modifications may be made therein without departing from the spirit of the invention or from the scope of the appended claims.

I claim:

1. In a motor vehicle, a chassis frame, a steering gear including a tubular cross shaft housing arranged with its axis substantially vertical, an upper rubber bushing supported by said chassis frame, said bushing receiving said tubular cross shaft housing, an external downwardly facing annular shoulder on said housing seating on said bushing, and a lower rubber bushing carried by said frame receiving said cross shaft housing, at least one of said bushings adhering to said cross shaft housing.

2. In a motor vehicle, supporting means, a resilient bushing carried by said supporting means having open upper and lower ends, a steering gear supported by and above said resilient bushing, and a depending tubular cross shaft housing carrying said steering gear and tightly received in said bushing to adhere thereto and place the bushing under sheer and compression forces.

3. In a motor vehicle, a supporting member, a resilient bushing carried by said supporting member, a steering gear above and overlying said bushing, a tubular steering gear cross shaft housing supporting said steering gear and in turn being supported by said bushing, said housing fitting tightly into said bushing to place the resilient material thereof under sheer, and a resilient seat on said bushing between said supporting member and said housing receiving said housing and displaceable to dampen sensible vibrations.

4. In a motor vehicle, a supporting member, an upright steering gear cross shaft housing adjacent said supporting member, an upper resilient bushing supported by said supporting member having an external shoulder resting on said supporting member, said bushing receiving said cross shaft housing therein, an external downwardly facing shoulder on said cross shaft housing and seating on said resilient bushing shoulder, and a lower resilient bushing carried by said supporting member receiving said cross shaft housing, at least one of said bushings adhering to said cross shaft housing.

5. In a motor vehicle, a supporting member, a steering gear cross shaft housing adjacent said supporting member, an upper cushioning member supported by said supporting member and surrounding and gripping a portion of said cross shaft housing, a downwardly facing shoulder on said cross shaft housing seating solely on said cushioning member, and a lower cushioning member spaced below said upper cushioning member and surrounding and gripping a lower portion of said cross shaft housing.

6. In a motor vehicle, a frame cross member, a steering gear above said cross member, a steering gear cross shaft housing supporting said steering gear and depending therefrom adjacent and below said frame cross member, a resilient bushing attached to said frame cross member receiving said cross shaft housing therein, a bracket mounted on said frame cross member and extending upwardly from said resilient bushing, and a resilient bushing supported by said bracket immediately above and in axial alignment with said first bushing and receiving said cross shaft housing, at least one of said bushings adhering to said housing to support the same and the steering gear under sheer as a means of attachment therebetween and said first and second bushings cooperating to restrain rocking of the steering gear relative to said frame cross member.

CLYDE R. PATON.

REFERENCES CITED

The following references are of record in the file of this patent:

UNITED STATES PATENTS

| Number | Name | Date |
| --- | --- | --- |
| 1,048,748 | Seaman | Dec. 31, 1912 |
| 1,125,621 | Winton et al. | Jan. 19, 1915 |
| 1,387,147 | Ford | Aug. 9, 1921 |
| 1,444,024 | Burdick | Feb. 6, 1923 |
| 1,483,903 | Masury | Feb. 19, 1924 |
| 1,533,093 | Booth | Apr. 14, 1925 |
| 1,572,519 | Davis | Feb. 9, 1926 |
| 1,802,004 | Derr | Apr. 21, 1931 |
| 1,830,119 | Marshall | Nov. 3, 1931 |
| 1,993,921 | Crawford | Mar. 12, 1935 |
| 2,344,848 | Berry | Mar. 21, 1944 |
| 2,436,153 | Sanmori | Feb. 17, 1948 |